Sept. 7, 1937.  P. HUNTZICKER  2,092,351
CENTRIFUGAL PUMP
Filed June 27, 1932
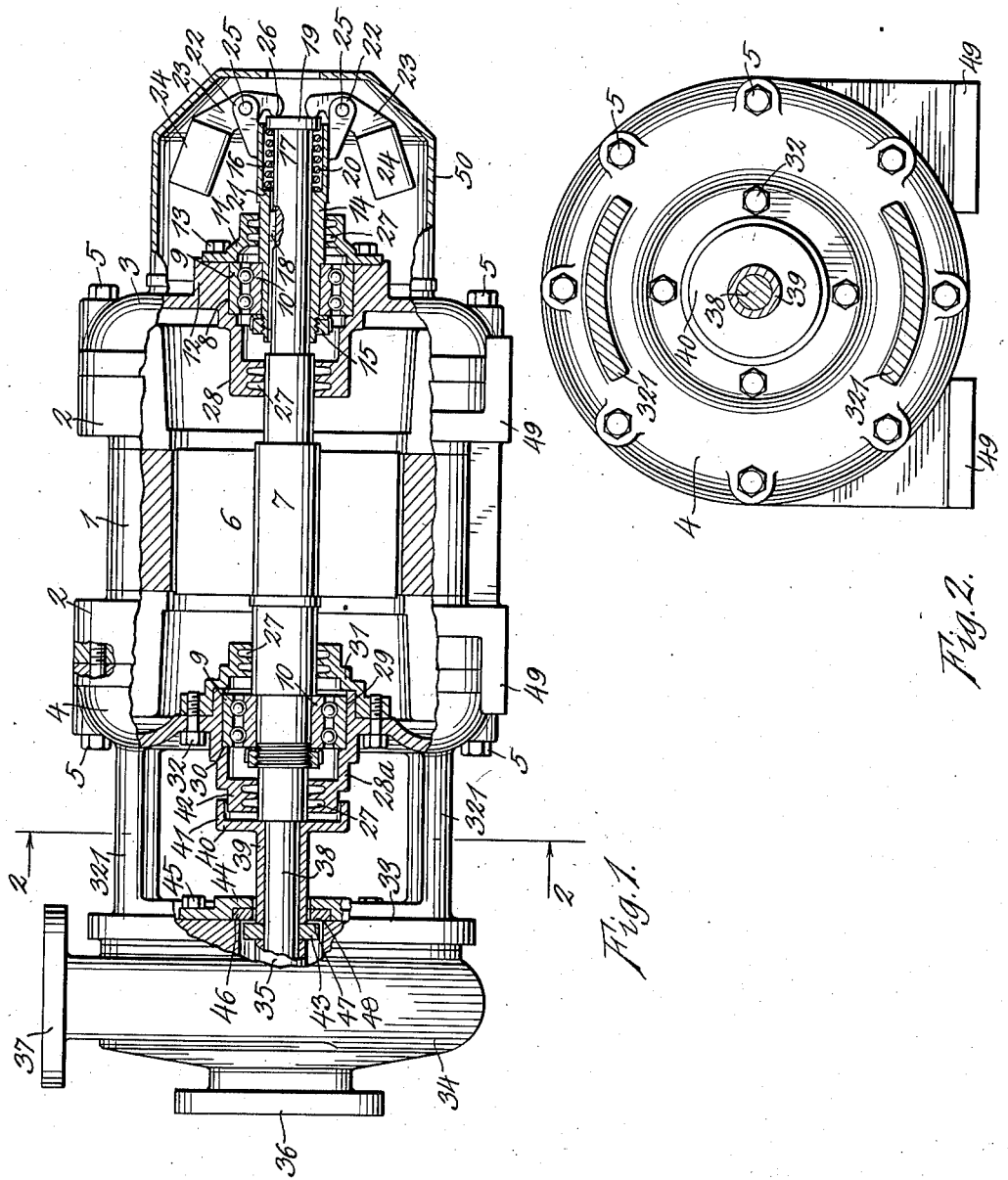
Inventor
Paul Huntzicker.
By A. J. O'Brien
Attorney Patented Sept. 7, 1937

2,092,351

UNITED STATES PATENT OFFICE 2,092,351

CENTRIFUGAL PUMP

Paul Huntzicker, Denver, Colo., assignor to A. R. Wilfley & Sons, Inc., a corporation of Colorado Application June 27, 1932, Serial No. 619,366

15 Claims. (Cl. 103—87)

This invention relates to improvements in centrifugal pumps, blowers, and similar machines.

In a wide range of industries, particularly those handling liquids, corrosive liquors, and gases, it is desirable to use machines so constructed as to minimize the undesirable effects and results of stuffing boxes. These machines are constructed in such a way that there is little or no escape of the fluid medium between the shaft and the machine housing while the machine is running or operating. On such machines provision is usually made for preventing any escape of the fluid medium between the shaft and machine housing when the machine is not operating.

It is one of the objects of this invention to produce in combination a machine and its driving unit having a common shaft with freedom to move longitudinally at predetermined periods.

Another object of this invention is to produce in combination a centrifugal pump, blower, or the like, and its driving unit, having a common integral shaft carrying the rotating parts, means for moving the shaft endwise a controlled distance at definite periods so as to seal the running clearance between the shaft and the pump housing to prevent the escape of the fluid medium while the pump is not operating, and provisions for moving the shaft endwise a controlled distance in the opposite direction so as to unseal the clearance between the shaft and the pump housing when the pump is running and thus allow the shaft and its rotating parts, particularly where same enter the pump housing, to revolve without a rubbing contact.

The above and other objects that will become apparent as this description proceeds are obtained by means of a construction and an arrangement of parts which will now be described in detail, and for this purpose a centrifugal pump as a machine in combination with an electric motor as its driving unit will be used as an illustration, representing probably the most important application of this invention. Reference will be had to the accompanying drawing, in which the preferred combination of the invention has been illustrated, and in which:

Figure 1 is a view partly in side elevation and partly in section showing the combined motor and pump and the essential features of the construction, and Figure 2 is a section taken on line 2—2, Figure 1.

In the drawing numeral 1 indicates the central portion of the stator of an electric motor, which is usually formed from laminated iron, and which is located between the end members 2 of said stator. The stator members are held together by means of bolts or other suitable securing means. Secured to the end members 2 are end bells 3 and 4. These end bells are of a peculiar construction and are advantageously used instead of the ordinary end bells employed with motors of this type. They are held in place by means of bolts 5. Located within the stator is a rotor 6, which is mounted on a drive shaft 7. The end members 2 of the motor are provided with feet or lugs 49 that are perforated for the reception of screws by means of which the assembly can be fastened to a base or to a support.

The end bell 4 is provided with a central cylindrical opening 29 in which a ball bearing comprising an outer ball race 9 and an inner ball race 10 is located. The opening 29 terminates in shoulder 30 against which ball race 9 abuts in one position. The length of the cylindrical surface is somewhat greater than the length of ball race 9. The latter is free to move longitudinally, the maximum longitudinal movement being controlled by the inner surface of the ring 31 which is attached to the inside of end bell 4 by means of bolts 32. Ring 31 has a heavy portion provided with grooves 27 that serve as lubricant seals. When ring 31 is in place the ball bearing can move a short distance in the manner above indicated. The end member 4 is provided with an outwardly extending hub 28a whose inner surface is provided with grooves 27 for the same purpose as the other corresponding grooves.

Extending outwardly from the end bell 4 are brackets or extensions 321 whose outer ends are connected by means of a cylindrical ring 33. An impeller housing 34 is secured to ring 33 by means of suitable bolts. The impeller housing is hollow and contains an impeller whose hub 35 is shown in Fig. 1. The impeller housing is provided with an intake opening 36 and an outlet opening 37. Shaft 7 extends into the interior of the impeller housing and carries an impeller, not shown, which may be of any approved construction. The reduced end 38 of the shaft has secured to it a sleeve 39. This sleeve is held against both longitudinal and rotary movement with respect to the shaft and has an outwardly extending flange 40 that terminates in the cylindrical portion 41 which projects over section 42 of the hub 28a. Secured to the shaft between the outer end of sleeve 39 and the inner end of hub 35 is a sealing ring 43 carrying a sealing surface 47. A removable ring 44 encircles sleeve 39 and is secured to the impeller housing by means of bolts 45. The ring 44 has an annular groove in its inner surface, in which sealing ring 46 carrying a sealing surface 48 is located.

The end bell 3 is constructed in a slightly different manner from end bell 4 and is provided with a central cylindrical opening 8 within which is located a ball bearing assembly comprising an outer ball race 9 and an inner ball race 10. A clamping ring 11 is secured to the hub portion 12 of the end bell by means of bolts 13 and serves to hold the ball bearing from lateral movement. The ball race 10 has secured to it an elongated sleeve 14. Nut 15 serves to hold race 10 in place on the sleeve. One end of the sleeve has a cylindrical chamber 16 which is of a larger diameter than the remainder of the bore of said sleeve, which chamber contains a coiled spring 20. The shaft 7 is provided with a cylindrical portion 17 that is of the proper size to fit the interior of the sleeve. The shaft is provided with a keyway, in which is located a key 18. The function of the key is to prevent relative rotation between the shaft and the sleeve and to permit the shaft and sleeve to move longitudinally with respect to each other. The shaft is provided with an enlarged head 19 that projects beyond the outer portion of the part 17 and forms a shoulder against which one end of the spring 20 abuts. The other end of the spring abuts against the shoulder 21 of said sleeve 14. The sleeve is provided with properly spaced lugs or ears 22 between which arms 23 of the weights 24 are located and to which the latter are pivoted by means of pins 25. The inner ends of arms 23 are provided with projections or lugs 26 that engage the outer end of the head 19. When the sleeve and the shaft rotate, the weights 24 tend to fly outwardly, by reason of centrifugal force, and cause lugs 26 which engage head 19 to move the shaft against the action of spring 20.

Clamping ring 11 has a hub portion that is provided with internal grooves 27 which serve as lubricant seals and tend to retain the lubricant in place. The end bell 3 is also provided with hub 28 whose inner surface has grooves 27 for the same purpose as the corresponding grooves in member 11. A housing 50 is attached to end bell 3 and encloses the centrifugal means secured to the end of the shaft.

When the shaft is stationary, the action of the spring 20 tends to move the shaft 7 and sealing ring 43 to the right, compressing spring 20 and bringing sealing surface 47 into contact with sealing surface 48. This prevents escape of any fluid medium around the shaft from the impeller housing when the pump is not operating. The weights 24 are so proportioned that when they rotate the effect of the force exerted on the head 19 of the shaft 7 overcomes the counteracting effect of the spring 20. The resultant force then moves shaft 7 and the sealing ring 43 in a direction toward the impeller housing 34 and separates the sealing surfaces 47 and 48. When the pump is operating, rubbing contact between these sealing surfaces is eliminated and a free running clearance between the stationary impeller housing 34 and the rotating shaft, where the shaft enters the impeller housing, is obtained. Pumps of the type above described are so constructed that little or no leakage of the fluid medium takes place between the shaft and impeller housing when the pump is operating.

Altho the device has been described as a centrifugal pump and is primarily intended for that purpose, it is evident that it is equally well adapted for any place where a movable member is to be rotated on the inside of a container or housing. Therefore the following claims are to be construed as including any container that contains a fluid medium and a rotor or rotating part that is turned in the fluid medium. The particular pump which is described and illustrated shows an impeller housing carried and supported from the driving unit. This is only for convenience and economy in small sizes and for larger sizes or other types of machines the housing may for mechanical reasons be supported from a base carrying collectively or separately the machine and its driving unit.

The term "motor" in the following claims is to be understood as embracing any driving means, such as electric motor, steam turbine, or other engine impelled by steam or other fluid agency.

Having described the invention what I claim as new is:

1. A machine of the class described comprising in combination, a rotary pump and an electric motor, said pump and motor having a common shaft mounted for rotation in suitable bearings on the motor frame, one bearing being a ball bearing fixed to the shaft and encased in a housing and having freedom to move in said housing, the other shaft bearing having a tubular sleeve rotating with the shaft and permitting endwise movement of the shaft in the sleeve, said sleeve being fixed to a thrust ball bearing rotating in a substantially fixed plane, the tubular sleeve carrying weights which rotate with the sleeve and shaft and in rotating exert a force on the shaft and cause the shaft and the elements fixed thereto to move endwise, a pump housing suitably supported from the motor frame and having an opening therein thru which the shaft enters the housing, an impeller in said pump housing and secured to the shaft, a stationary sealing surface on the pump housing, and a rotating sealing surface on the shaft, said surfaces being separated by said endwise movement imparted to the shaft by the weights and thereby giving free running clearance between said sealing surfaces when the shaft rotates, and a spring acting on the shaft so as to move the same endwise and bring the two co-operative sealing surfaces into contact when the shaft is not rotating.

2. A unitary electric motor and rotary pump comprising in combination a motor stator provided with a central opening for a rotor, and end bells secured one to each end of the stator, the end bells having each a bearing, a tubular sleeve mounted for rotation in one of the bearings, means for preventing the sleeve from moving in the direction of its length with respect to the bearing, a shaft common to the motor and the pump, a rotor for the shaft, one end of the shaft extending thru the sleeve, means for preventing relative rotation between the sleeve and the shaft while permitting relative longitudinal movement, the other end of the shaft extending thru the bearing in the other end bell, an impeller housing connected with the last named end bell, the side of the housing nearest the end bell having an opening slightly larger than the shaft and thru which the shaft extends, an impeller in said housing and secured to the shaft, two co-operative sealing surfaces, one carried by the shaft and the other on the impeller housing, a spring interposed between the shaft and the sleeve and acting to impart longitudinal movement to the shaft to engage the sealing surfaces when the motor and pump are not in operation, and centrifugal means carried by the sleeve and acting to impart longitudinal movement to the shaft to disengage the sealing surfaces when the pump and motor are in operation.

3. A combined rotary pump, blower or similar machine and a driving motor therefor, comprising in combination, a housing for containing a fluid medium, a rotor in the housing, a shaft secured to the rotor and extending thru an opening in the housing, the opening being larger than the shaft, two co-operative sealing surfaces, one being attached to the shaft and adapted to co-operate with the other surface carried on the housing to seal the opening around the shaft, means comprising a spring for moving the sealing surfaces together when the shaft ceases to rotate, a motor surrounding and connected with the shaft for turning same, and centrifugal means operated by the rotation of the shaft for moving the shaft against the action of the spring to separate the sealing surfaces when the shaft is rotating.

4. A rotary pump or the like in combination with an electric motor, said motor having a motor frame, a stator, and a rotor mounted on a shaft extending on each side of the rotor, a suitable bracket connected with the motor frame, a pump housing connected to the bracket, one end of said shaft extending into the pump housing and carrying a pump impeller, sealing surfaces in the region where the shaft enters the pump housing, one of the sealing surfaces being on the shaft and the other sealing surface being on a part mounted on the pump housing, a ball bearing mounted on the shaft between the motor and the pump and carried in a bearing housing with freedom to slide in the housing, a tubular sleeve mounted on the other end of the shaft extension by means which allows the shaft to slide in the sleeve and at the same time cause the sleeve to rotate with the shaft, a ball bearing mounted on the sleeve and carried by the motor frame in a substantially fixed position, centrifugal weights mounted on the tubular sleeve and acting to exert a force on the shaft when rotating to thereby move the shaft longitudinally in one direction to separate the two sealing surfaces and thus maintain a free running clearance between the same when the shaft is rotated, and a spring located between the tubular sleeve and the shaft and acting to move the shaft longitudinally in the opposite direction and thus bring the two sealing surfaces together to prevent leakage between the shaft and pump housing.

5. A unitary pump and motor comprising a motor having a casing; a pump housing attached to the motor casing; a shaft journaled in the motor casing and driven by the motor and extending into the pump housing through an opening in the latter; an impeller in the pump housing and attached to the motor shaft; cooperating sealing surfaces carried by the shaft and the pump housing respectively and acting to seal and unseal the opening in the pump housing through which the shaft passes; and means acting automatically to move the shaft in the direction of its length to separate the sealing surfaces when the shaft turns and to bring them into contact when the shaft ceases to rotate.

6. A unitary rotary pump and motor comprising, in combination, a motor having a casing; a motor shaft journaled in the casing; a pump housing attached to the motor casing, the side of the housing adjacent the motor having an opening through which the motor shaft extends; an impeller located in the housing and attached to the shaft; sealing means for opening and closing the opening in the pump housing around the shaft; and means located on the side of the motor opposite from the pump housing and acting to automatically open the sealing means when the shaft reaches a predetermined speed of rotation and to automatically close the sealing means when the speed of rotation of the shaft falls below the predetermined speed.

7. A machine and motor unit comprising in combination, a motor shaft having elements of the machine and of the motor secured thereto for rotation therewith, said shaft being so mounted as to be capable of endwise movement; sealing means between said machine and said motor and adapted to be opened and closed by endwise movement of said shaft; means for automatically shifting said shaft endwise at a predetermined period in the cycle of machine operation, thereby opening said sealing means; and means for automatically shifting said shaft in the reverse direction at another predetermined period, thereby closing said sealing means.

8. A machine and motor unit comprising in combination, a motor shaft having elements of the machine and of the motor secured thereto for rotation therewith, said shaft being so mounted as to be capable of endwise movement; sealing means between said machine and said motor and adapted to be opened and closed by endwise movement of said shaft; centrifugal means for automatically shifting said shaft endwise at a predetermined period in the cycle of machine operation, thereby opening said sealing means; and resilient means for automatically shifting said shaft in the reverse direction at another predetermined period, thereby closing said sealing means.

9. A rotary pump and electric motor unit comprising in combination, a casing for the pump and a casing for the motor, said casings being fastened together; a shaft journaled in the motor casing and extending into the pump casing and having secured thereto for rotation therewith the impeller of said pump and the rotor of said motor, and said shaft being so mounted as to be capable of endwise movement; two sealing members, one movable with said shaft the other on said pump casing; means for automatically shifting said shaft endwise at a predetermined period in the cycle of machine operation, thereby separating said sealing members; and means for automatically shifting said shaft in the reverse direction at another predetermined period, thereby bringing said members into sealing contact.

10. A machine and motor unit, comprising in combination, a casing for the machine and a casing for the motor secured to the machine casing; a shaft common to the machine and motor, which shaft passes from the motor casing into the machine casing and is mounted so as to be capable of endwise movement while the machine is in operation, said shaft having secured thereto for rotation therewith elements of the machine and elements of the motor; and means for automatically shifting said shaft in one direction when its speed of rotation exceeds a certain predetermined limit and for automatically shifting it in the reverse direction when its speed falls below a predetermined limit, parts of said shifting means being located on the side of the motor casing opposite to the machine casing.

11. A machine and motor unit comprising in combination, a horizontal shaft having elements of the machine and of the motor secured thereon for rotation therewith, said shaft being so mounted as to be capable of endwise movement; sealing means actuated by endwise movement of the shaft for sealing and unsealing an opening through which the shaft passes in extending from the motor to the machine; means for automatically shifting said shaft endwise at a predetermined period in the cycle of machine operation, thereby opening said sealing members; and means for automatically shifting said shaft in the reverse direction at another predetermined period, thereby closing said sealing means.

12. A rotary pump and motor unit comprising in combination, a horizontal shaft having elements of the pump and of the motor secured thereon for rotation therewith, said shaft being so mounted as to be capable of endwise movement; sealing members adapted to be engaged and disengaged by endwise movement of the shaft for sealing and unsealing an opening in the pump housing through which the shaft passes in extending from the motor to the pump, one of said sealing members being movable with the shaft; means for automatically shifting said shaft endwise at a predetermined period in the cycle of the pump operation, thereby disengaging the sealing members; and means for automatically shifting said shaft in the reverse direction at another predetermined period, thereby engaging said sealing members.

13. A rotary pump and motor unit comprising in combination, a horizontal shaft having elements of the pump and of the motor secured thereon for rotation therewith, said shaft being so mounted as to be capable of endwise movement; sealing members adapted to be engaged and disengaged by endwise movement of the shaft for sealing and unsealing an opening in the pump housing through which the shaft passes in extending from the motor to the pump, one of said sealing members being movable with the shaft; means for automatically shifting said shaft endwise at a predetermined period in the cycle of the pump operation, thereby disengaging the sealing member; and means for automatically shifting said shaft in the reverse direction at another predetermined period, thereby engaging said sealing members and there being no stuffing box or other relatively rotatable surfaces in engagement with each other during rotation of the shaft for sealing the opening in the pump housing through which the shaft passes.

14. A combined pump and pump driving motor unit including in combination, a combined supporting frame and casing; a single rotary shaft rigid from end to end and movable back and forth longitudinally; spaced bearings supporting said shaft in said frame-casing with the ends of the shaft projecting or extending beyond said bearings respectively; a driving motor comprising a stator supportingly mounted on said frame-casing and a rotor within said stator and surrounding said shaft between its said bearings; means connecting said rotor of the motor to said shaft to cause the same to rotate together; a pump casing forming part of said frame-casing and having an opening through which one projecting end of the shaft freely passes into the interior of said pump casing; a rotary pump within said pump casing and secured to said end of the shaft; cooperating sealing surfaces on said shaft and pump casing respectively and adapted to be engaged and disengaged by longitudinal movement of the shaft to open and/or close said opening in the pump casing through which said shaft passes to the interior of said casing; and means at the other projecting end of the shaft acting automatically to longitudinally shift the shaft in one direction to disengage said sealing surfaces while the motor is driving the shaft and to shift the shaft in the other direction to engage said sealing surfaces when the motor is not driving the shaft.

15. A combined pump and pump driving electric motor unit including in combination, a combined supporting frame and casing; a single shaft rigid from end to end and adapted to have both rotary movement and limited longitudinal movement in opposite directions; spaced bearings supporting said shaft in said frame-casing for both rotary and longitudinal movement and with the ends of the shaft extending or projecting beyond both of its said bearings; an electric motor having its field mounted on said frame-casing and its armature surrounding said shaft between its said spaced bearings; means connecting said armature to said shaft to cause the same to rotate together; a pump casing forming part of said frame-casing and having an opening through which one projecting end of the shaft freely passes into the interior of said pump casing; a rotary pump member within said pump casing and secured to said end of the shaft; cooperating sealing surfaces on said shaft and pump casing respectively and adapted to be engaged and disengaged by longitudinal movement of the shaft to open and/or close said opening in the pump casing through which said shaft passes to the interior of said casing; and means at the other projecting end of the shaft acting automatically to longitudinally shift the shaft in one direction to disengage said sealing surfaces while the motor is driving the shaft and to shift the shaft in the other direction to engage said sealing surfaces when the motor is not driving the shaft.

PAUL HUNTZICKER.